US006408559B2

(12) United States Patent
Mathews

(10) Patent No.: US 6,408,559 B2
(45) Date of Patent: *Jun. 25, 2002

(54) ANIMATED WATERFOWL DECOY APPARATUS

(76) Inventor: Robert Mathews, 8800 Mathews La., Marysville, CA (US) 95901

( * ) Notice: Subject to any disclaimer, the term of this patent is extended or adjusted under 35 U.S.C. 154(b) by 0 days.

This patent is subject to a terminal disclaimer.

(21) Appl. No.: 09/737,330

(22) Filed: Dec. 12, 2000

Related U.S. Application Data

(63) Continuation of application No. 09/273,875, filed on Mar. 22, 1999, now Pat. No. 6,170,188.

(51) Int. Cl.[7] .............................................. A01M 31/06
(52) U.S. Cl. ......................................................... 43/3
(58) Field of Search ........................ 43/2, 3, 26.1, 26.2

(56) References Cited

U.S. PATENT DOCUMENTS

| | | | | |
|---|---|---|---|---|
| 282,851 A | * | 8/1883 | Danz, Jr. ........................ 43/3 |
| 843,588 A | * | 2/1907 | Ditto ............................... 43/3 |
| 1,091,491 A | * | 3/1914 | Ebur ........................... 43/21.2 |
| 2,229,175 A | * | 1/1941 | Johnson ........................... 43/3 |
| 2,692,451 A | * | 10/1954 | Deuster ........................... 43/3 |
| 3,736,688 A | * | 6/1973 | Caccamo ......................... 43/3 |
| 3,768,192 A | * | 10/1973 | Caccamo ......................... 43/3 |
| 3,835,568 A | * | 9/1974 | Whitfield .................... 43/21.2 |
| 4,120,112 A | * | 10/1978 | McBain ....................... 43/26.1 |
| 4,620,385 A | * | 11/1986 | Carranza et al. .............. 428/16 |
| 4,845,873 A | * | 7/1989 | Hazlett ............................. 43/3 |
| 4,896,448 A | * | 1/1990 | Jackson ............................ 43/3 |
| 5,003,722 A | * | 4/1991 | Berkley et al. ................... 43/3 |
| 5,014,458 A | * | 5/1991 | Wagner ....................... 43/21.2 |
| 5,105,573 A | * | 4/1992 | May ............................ 43/26.2 |
| 5,144,764 A | * | 9/1992 | Peterson .......................... 43/3 |
| 5,168,649 A | * | 12/1992 | Wright ............................. 43/2 |
| 5,231,780 A | * | 8/1993 | Gazalski .......................... 43/3 |
| 5,247,759 A | * | 9/1993 | Noriega ....................... 43/21.2 |
| 5,488,798 A | * | 2/1996 | Beachel ...................... 43/21.2 |
| 5,636,466 A | * | 6/1997 | Davis ............................... 43/3 |
| 5,809,683 A | * | 9/1998 | Solomon .......................... 43/3 |
| 5,862,619 A | * | 1/1999 | Stancil ............................. 43/3 |
| 5,884,427 A | * | 3/1999 | Lenz ................................ 43/2 |
| 5,930,936 A | * | 8/1999 | Parr et al. ........................ 43/3 |
| 5,974,720 A | * | 11/1999 | Bowling .......................... 43/3 |
| 6,092,323 A | * | 7/2000 | McBride et al. ................. 43/3 |
| 6,170,188 B1 | * | 1/2001 | Mathews .......................... 43/3 |
| 6,321,480 B1 | * | 11/2001 | Solomon .......................... 43/3 |
| 6,339,894 B1 | * | 1/2002 | Solomon .......................... 43/3 |

* cited by examiner

*Primary Examiner*—Darren W. Ark
(74) *Attorney, Agent, or Firm*—Brian Beverly

(57) ABSTRACT

An animated waterfowl decoy apparatus includes a decoy housing, a pair of decoy wing members rotatably connected to the decoy housing, and an elongated stand supporting the housing to position the decoy housing over the surface of a body of water. The apparatus may be readily converted between wind-powered operation and motor-powered operation.

39 Claims, 4 Drawing Sheets

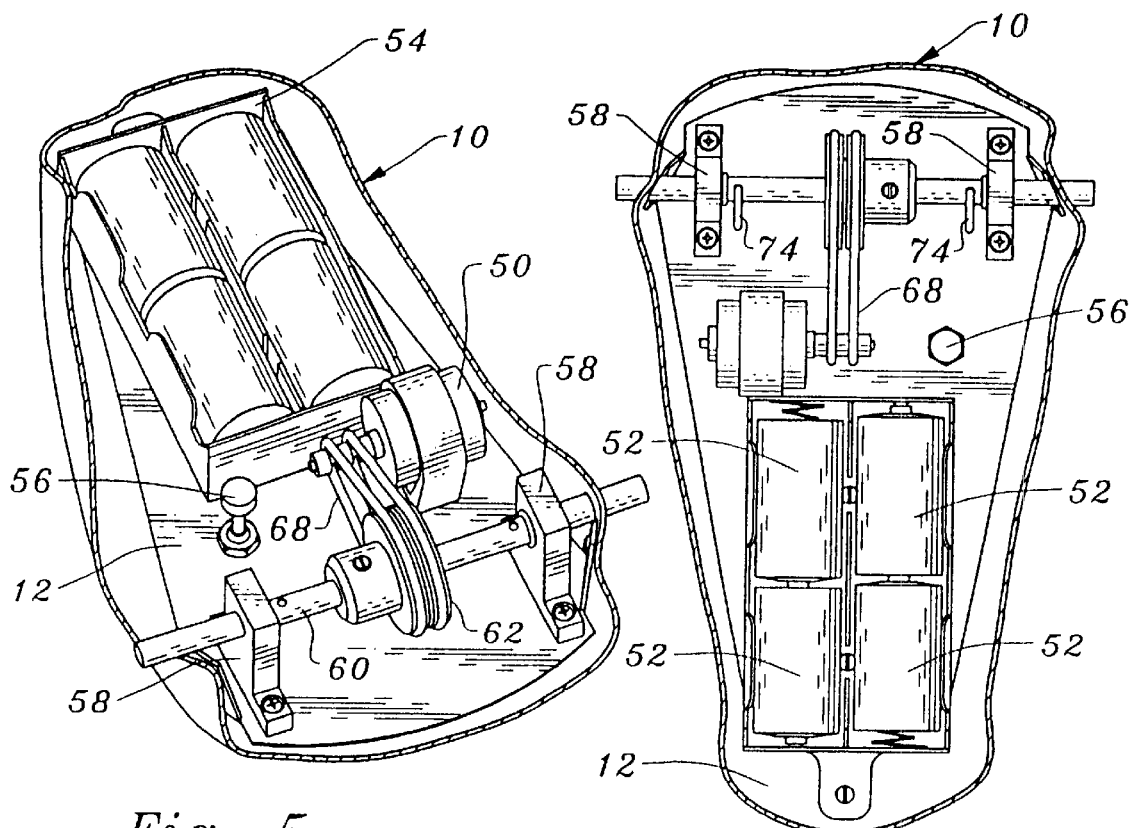
Fig. 5
Fig. 6
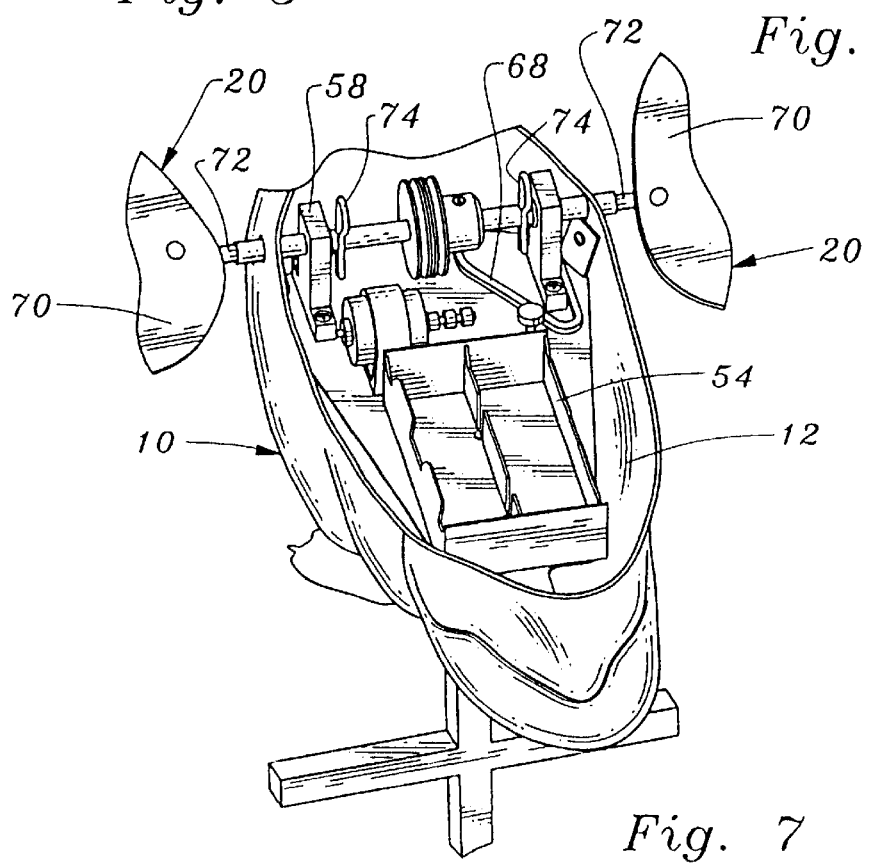
Fig. 7

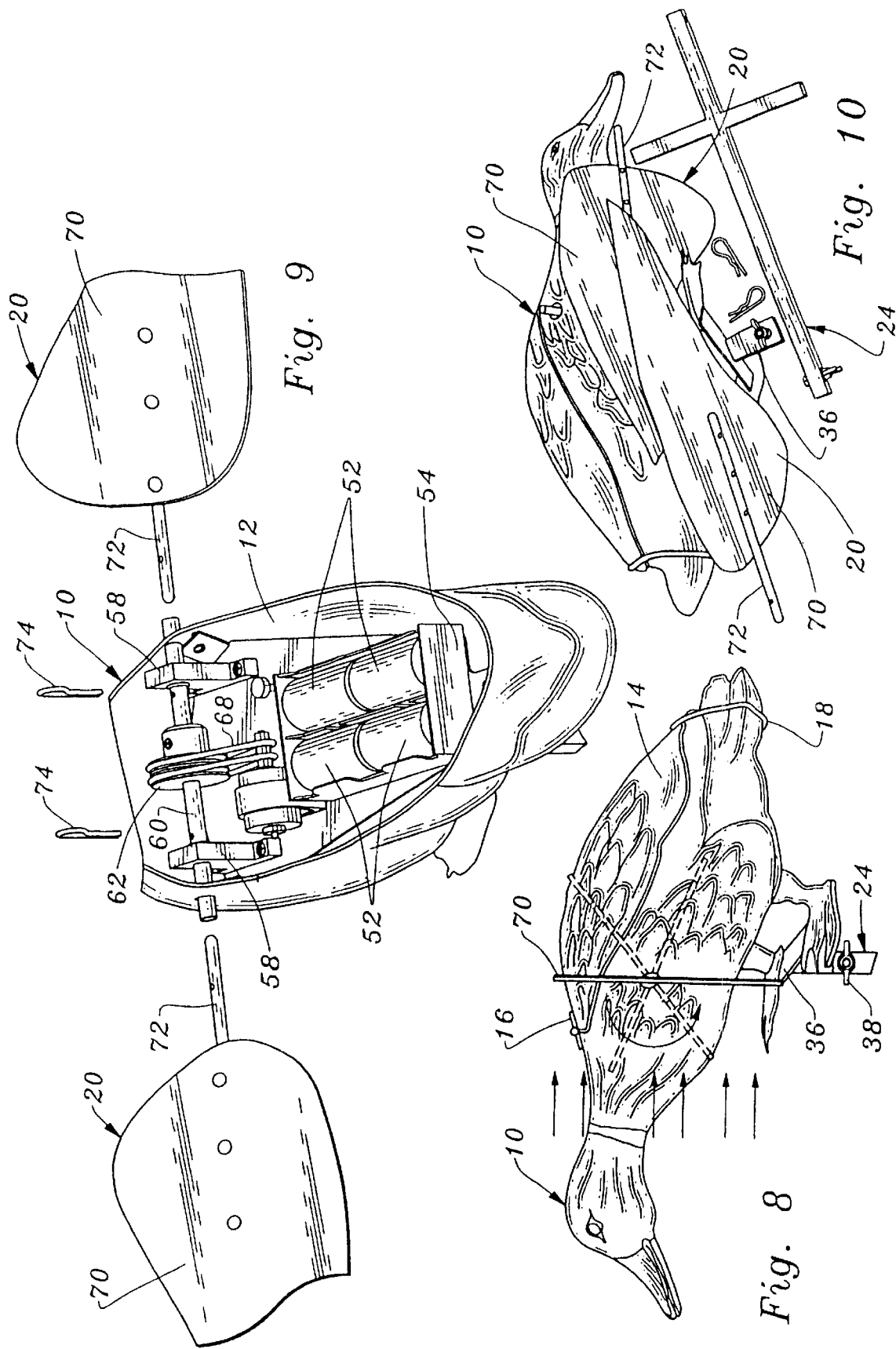

US 6,408,559 B2

ANIMATED WATERFOWL DECOY APPARATUS

This continuation application, filed under 37 CFR 1.53 (b), is a continuation of U.S. patent application Ser. No. 09/273,875, filed Mar. 22, 1999 now U.S. Pat. No. 6,170,188.

FIELD OF THE INVENTION

This invention relates to waterfowl decoy apparatus which is for the purpose of attracting waterfowl to a particular location. The apparatus incorporates rotating wings and has particular application to installation at a water site. It can also be deployed at a land site. The principles of the invention can also be applied to apparatuses simulating other types of birds, such as replicas of owls employed to ward off pigeons or other pests.

BACKGROUND OF THE INVENTION

The use of decoys to attract waterfowl is an ancient practice. Typically, prior art decoys float on the surface of a body of water. A relatively recent development in the art of waterfowl decoys has been to provide some means for moving all or part of the decoy, the objective being to provide a decoy which appears more natural to waterfowl such as ducks or geese.

U.S. Pat. No. 5,809,683 to Solomon, issued Sep. 22, 1998, discloses a battery-powered apparatus to provide movable wings and feet on waterfowl decoys. The decoy floats on the surface of the water and incorporates wings which move back and forth.

U.S. Pat. No. 4,896,448, issued to Jackson Jan. 30, 1990, discloses a bird decoy, including a body and a flapping mechanism mounted therein moving a pair of wings which oscillate with respect to the body. The bird decoy is for positioning on the surface of a body of water.

U.S. Pat. No. 4,620,385, issued to Carranza Nov. 4, 1986, discloses a waterfowl decoy which incorporates a pair of rotatable wings slidably and rotatably received and secured on the axle of a bracket carried by the waterfowl decoy. The wings rotate when subjected to a breeze.

U.S. Pat. No. 5,003,722, to Berkley, issued Apr. 2, 1991, discloses a game bird decoy cut from flexible sheet plastic foam material and mounted on a pole to simulate the silhouette of a bird approaching landing on water or land.

U.S. Pat. No. 5,231,780, to Gazalski, issued Aug. 3, 1993, discloses a plastic-shelled game bird decoy operable through a cord, wire, rope, or the like, to cause wing flapping or flagging movement.

U.S. Pat. No. 5,144,764, to Peterson, issued Sep. 8, 1992, discloses a decoy with a pair of flexible wings which fluctuate in a flapping action in response to air flow over the wings.

U.S. Pat. No. 5,636,466, to Davis, issued Jun. 10, 1997, discloses an animal decoy apparatus including radio-controlled upper appendages. In the case where the animal is a waterfowl, the appendages simulate wings.

U.S. Pat. No. 5,862,619 to Stancil, issued Jan. 26, 1999, discloses an animated decoy wherein the appearance of symmetrical lateral movement, such as the flapping of a bird's wings, is provided by a rotating vane which has a light side and dark side. The patent suggests possible use of a motor to rotate the vane.

SUMMARY OF THE INVENTION

The present invention relates to a waterfowl decoy apparatus incorporating a unique combination of structural elements which cooperate in a unique manner to provide a highly effective attractant to flying waterfowl, such as ducks or geese.

The apparatus provides for positioning of the decoy per se above the surface of a body of water so that damage to the decoy housing and mechanism employed therein is minimized. The animation of the decoy provides a display which attracts waterfowl to the location of the apparatus, the display being caused by a housing in the shape of a waterfowl and rotating wings just above the surface of the body of water where the apparatus is positioned. The apparatus is capable of being powered either by an electric motor or by the force of wind.

The apparatus may be readily broken down into individual structural components for shipping or storage purposes.

The waterfowl decoy apparatus of the present invention includes a decoy housing having the configuration of a waterfowl's body and defining a housing interior.

Decoy wing members are rotatably connected to the decoy housing and extend outwardly from opposite sides of the decoy housing.

An electric motor is disposed within the housing interior along with a transmission means for operatively interconnecting the electric motor to the pair of decoy wing members.

Electric battery means are operatively associated with the electric motor to energize and cause operation of the electric motor. The transmission means, when operatively interconnecting the electric motor to the decoy wing members, causes rotation of the decoy wing members responsive to energizing and operation of the electric motor.

The waterfowl decoy apparatus also includes an elongated support stand connected to the decoy housing and extending downwardly therefrom. The elongated support stand has a lower distal end for positioning in the earth under a body of water to support the decoy housing above the surface of the body of water.

Other features, advantages, and objects of the present invention will become apparent with reference to the following description and accompanying drawings.

BRIEF DESCRIPTION OF DRAWINGS

FIG. 5 is a partial sectional perspective view illustrating selected components disposed within the interior of the decoy housing as seen from the front.

FIG. 6 is a partial sectional top view illustrating the components within the housing interior, the rear end of the housing being disposed downwardly in FIG. 6.

FIG. 7 is a partial sectional perspective view illustrating the components of the interior of the housing with batteries removed and drive belt in a position operatively disengage wing members from an electric motor to permit movement of the wing members by wind.

FIG. 8 is a side elevational view illustrating the decoy housing oriented head-first into wind, the wind rotating the wing members.

FIG. 9 is a partial sectional exploded top perspective view illustrating assembly of selected structural components of the apparatus.

FIG. 10 is a perspective view illustrating the waterfowl decoy apparatus broken down into its individual components for shipping or storage purposes.

DETAILED DESCRIPTION OF THE ILLUSTRATED EMBODIMENT

Figure 2:
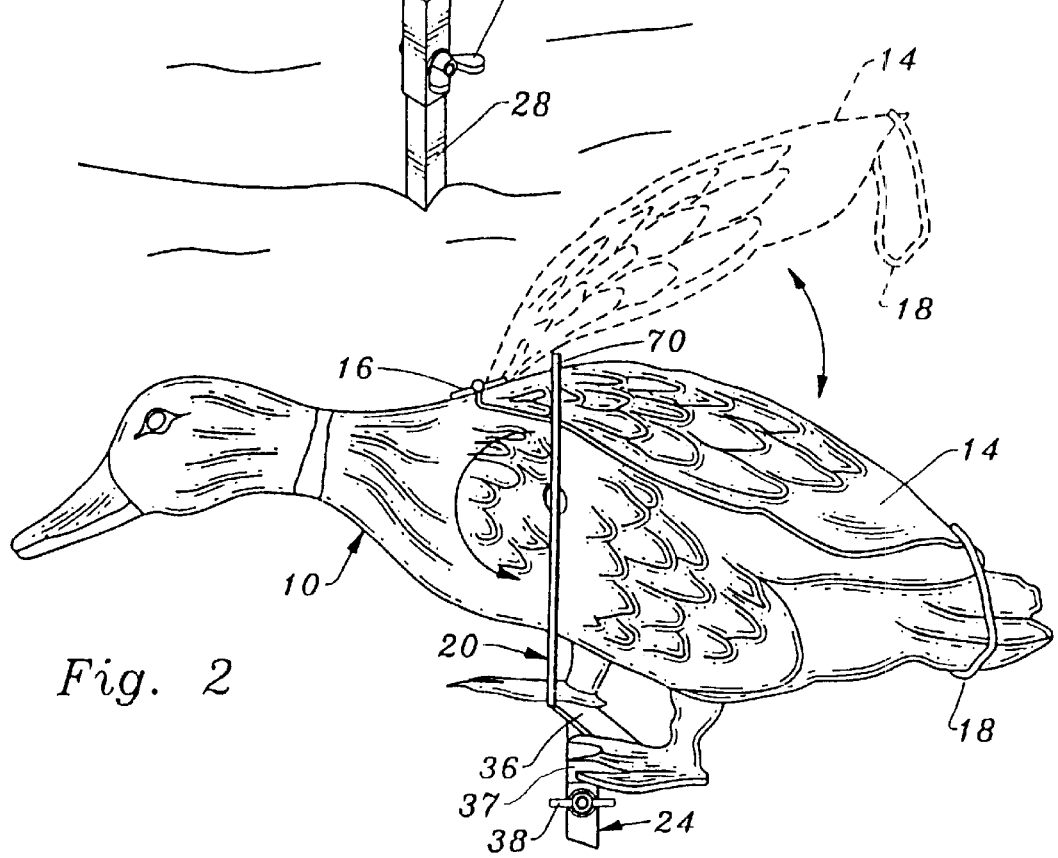
FIG. 2 is a side elevational view of an upper portion of the apparatus and illustrating movement of a cover employed in the decoy housing movable between open and closed positions.
Figure 3:
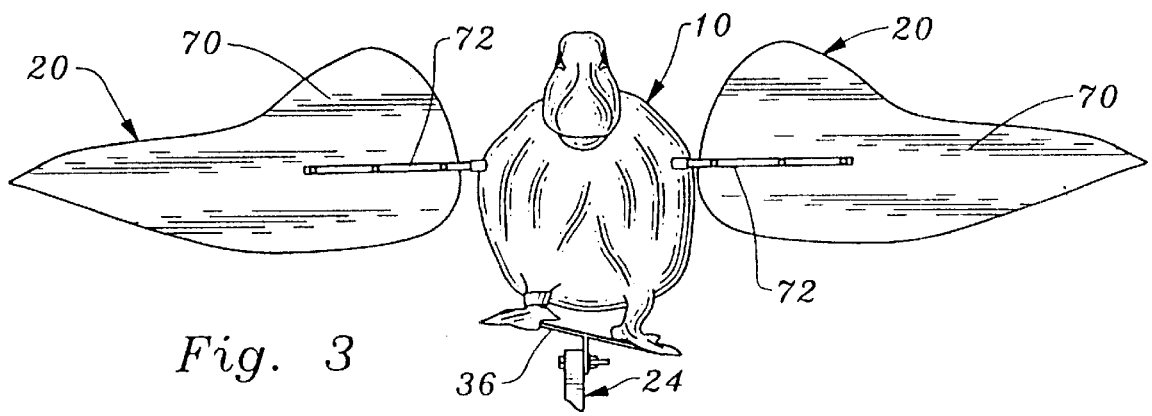
FIG. 3 is a frontal elevational view of an upper portion of the apparatus.
Figure 4:
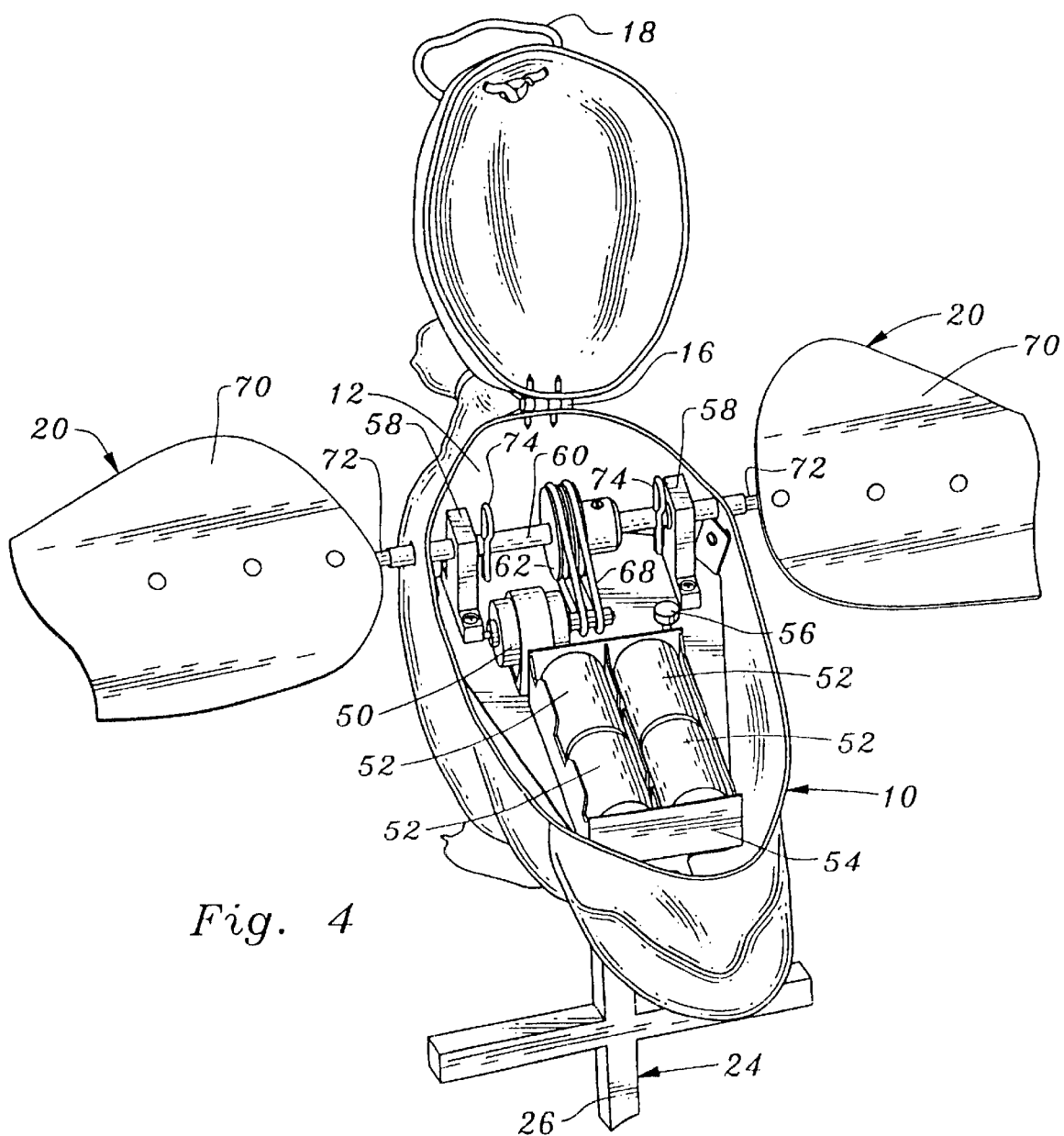
FIG. 4 is a partial perspective view illustrating the cover of the decoy housing in open position disclosing the contents of the housing interior.

Referring initially to FIG. 4 of the drawings, a waterfowl decoy apparatus constructed in accordance with the present invention includes a decoy housing 10 having the configuration of a waterfowl's body and defining a housing interior 12. The decoy housing may be constructed of any suitable material such as plastic or fiberglass and includes a cover portion 14, as seen in FIG. 2, connected to the rest of the decoy housing by a hinge 16 and moveable between a closed position wherein the housing interior is closed by the cover portion as shown in solid lines in FIG. 2, and an open position shown in dashed lines wherein the housing interior is exposed for access by an individual. Any suitable means such as an elastic band 18 may be employed to releasably retain the cover portion closed.

A pair of decoy wing members 20 are rotatably connected to the decoy housing and extend outwardly from opposite sides of the decoy housing. The structure of the decoy wing members and their cooperative relationship with other structural elements of the apparatus is discussed in detail below.

The waterfowl decoy apparatus includes an elongated support stand 24 connected to the decoy housing 10 and extending downwardly therefrom. The elongated support stand may be formed of any suitable material such as metal, for example steel or aluminum, or plastic.

Figure 1:
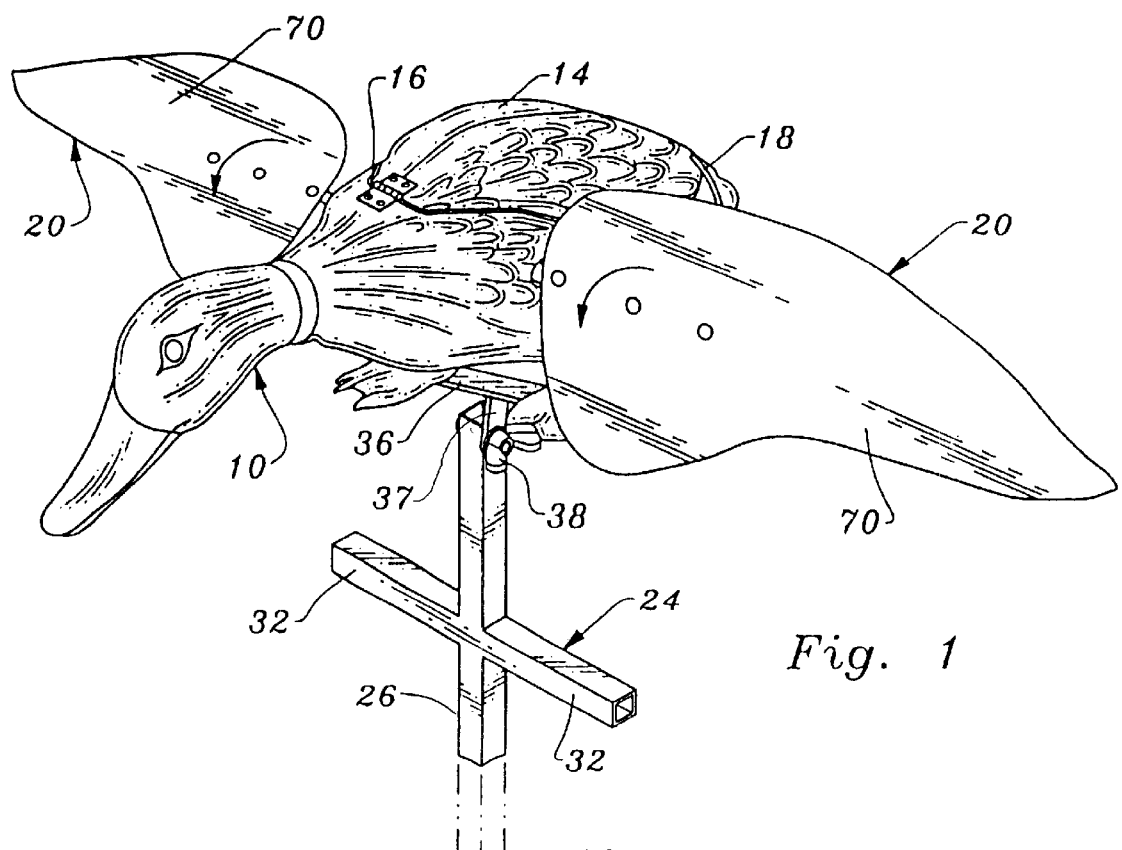
FIG. 1 is a frontal perspective view illustrating the waterfowl decoy apparatus of the present invention positioned in a body of water.

Support stand 24 includes telescoping elongated support stand members 26, 28, as seen in FIG. 1, which are relatively movable with respect to one another and locked against movement when the support stand is the desired length by any suitable expedient such as connector 30. Connector 30 includes a bolt and wing nut, the bolt passing through aligned apertures (not shown) in the support stand members to provide the desired support stand length.

The elongated support stand 24 has a lower distal end for positioning in the earth under a body of water to support the decoy housing above the surface of the body of water shown in FIG. 1. The support stand 24 includes handle members 32 for grasping by hand to facilitate positioning of the elongated support stand in the earth. Decoy housing 10 includes a support member 36 for connecting the housing 10 to support stand 24. As seen in FIGS. 1 and 2, support member 36 is generally T-shaped and is affixed to the bottom of housing 10. A downwardly depending portion 37 of support member 36 includes a hole for receiving a threaded connector 38, such as a bolt and wing nut, disposed in a transverse aperture at a top end of support stand 24. This arrangement firmly secures the housing 10 to support stand 24, and allows the forward and aft pitch of the bird body housing 10 to be selectively adjusted to more accurately simulate a bird in flight about to land on the surface of a body of water. In the preferred embodiment the support stand 24 has a squared cross-section such that when it is anchored in the earth below the water, it resists rotation about its longitudinal axis. Joining the housing 10 to the support stand 24 using support member 38 likewise prevents the bird body housing, which is subject to substantially greater aerodynamic forces, from rotating in the wind, and allows directional placement of the apparatus in a desired location with assurance that it will remain in the chosen direction.

Mounting shafts 72 are inserted into recesses formed in the ends of shaft 60, as seen in FIG. 9. In the illustrated embodiment, the mounting shafts 72 are secured in place by cotter pins 74 which are placed in aligned holes formed in the shaft 60 and mounting shafts 72. It will be appreciated and understood by those having skill in the art that the ends of shaft 60 could be inserted into recesses in mounting shafts 72 and that shaft 60 and mounting shafts 72 can be secured together by any expedient, including set screws, nuts and bolts, a spring biased finger and aperture combination, or threaded fasteners.

Shaft 60, pulley 62, drive belt 68, and cotter pins 74 together comprise a wing member drive means. When the wing members 20 are secured in place by cotter pins 74 and batteries 52 are in place, actuation of switch 56 will energize motor 50 thus rotating the shaft 60 and wing members 20 to present an attractive display to flying waterfowl. Movement of the wings may also serve to cause a certain amount of agitation of the water surface if the wings are disposed relatively close thereto.

If desired, the apparatus can be readily converted to wind power use. This is accomplished as shown in FIG. 7 by moving the drive belt 68 out of operative engagement with the pulley 62 and electric motor 50. Wings 70 are suitably shaped using known aerodynamic principles to rotate from the force of the wind as shown in FIG. 8.

The apparatus can be readily partially disassembled so that its primary structural components are separate as shown in FIG. 10. This allows the apparatus to be stored and/or shipped in a smaller container than would be the case if the assembled apparatus were involved. It should also be noted with reference to FIG. 10 that the support stand members are completely telescoped to reduce the overall size of the support stand during storage and shipment.

Modifications can be made to the apparatus if desired. For example, the apparatus can be employed using conventional signal transmission equipment to permit remote on/off control.

There have thus been described and illustrated certain preferred embodiments of an apparatus for attracting waterfowl according to the invention. Although the present invention has been described and illustrated in detail, it is clearly understood that the same is by way of illustration and example only and is not to be thus limited, the spirit and scope of the present invention being limited only by the terms of the appended claims and their legal equivalents.

I claim:

1. An animated bird replica apparatus employable as a decoy, said apparatus comprising:
    a housing having the configuration of a bird's body having a housing top simulating a bird body top, a head end, said head end resembling a head of a bird, a tail end, and a longitudinal axis extending between said head end and said tail end, said housing defining a housing interior, and
    a pair of bird wing members rotatably connected to said housing between said head end and said tail end, said pair of bird wing members extending outwardly from opposed sides of said housing laterally of said longitudinal axis and fully rotatable around a common axis, said pair of bird wing members further resembling a pair of extended bird wings, an elongated support stand connected to said housing, said support stand extending downwardly from said housing, said support stand having a lower distal end for anchoring in the earth under a body of water and having adequate length to support said housing sufficiently above the surface of a body of water such that said bird wing members are out of contact with the water, but close enough to the surface of the water such that said housing and said bird wing members simulate a bird in flight near a surface of a body of water with wings extended as though about to land.

2. The animated bird replica apparatus of claim 1 including:

an electric motor disposed within said housing interior, transmission means disposed within said housing interior for removably interconnecting said electric motor to said pair of bird wing members, said transmission means including a rotatable bird wing member support within said housing interior extending between, removably connected to, and supporting said bird wing members, and electric battery means operatively associated with said electric motor to energize and cause operation of said electric motor, said transmission means operatively interconnecting said electric motor to said pair of bird wing members for causing rotation of said bird wing members responsive to operation of said electric motor.

3. The animated bird replica apparatus of claim 2 including:

said wing members having inwardly extending mounting shafts, and cotter pins each extending through said rotatable bird wing member support and one of said mounting shafts releasably connecting said mounting shafts to opposed ends of said rotatable bird wing member support.

4. The animated bird replica apparatus of claim 1 wherein: said common axis is horizontal.

5. The animated bird replica apparatus of claim 2 wherein: said housing is movable for adjusting the forward and aft pitch thereof relative to said support stand.

6. The animated bird replica apparatus according to claim 1, wherein:

said longitudinal axis extending between said head end and said tail end is generally transverse to said support stand.

7. The animated bird replica apparatus according to claim 1, wherein:

each of said pair of bird wing members has a planar geometry including a proximal portion, a distal portion, and a wing tip portion, said proximal portion nearer said housing than said distal portion, and said proximal portion having a transverse dimension generally wider than said distal portion, and said wing tip portion being at a furthest outward extent of each of said wing members, said distal portion generally tapering off toward said wing tip portion.

8. An aminated bird replica apparatus employable as a decoy comprising:

a housing having a housing top simulating a substantially complete bird body, said housing having a head end, said head end resembling a head of a bird, a tail end, and a longitudinal axis extending between said head end and said tail end, a pair of bird wing members rotatably connected to said housing between said head end and tail end thereof, said wing members extending laterally of said longitudinal axis of said housing from opposite sides of said housing and being fully rotatable about a common axis of rotation which is substantially perpendicular to said housing's longitudinal axis, said pair of bird wing members further resembling a pair of extended bird wings, and an elongated support stand connected to said housing and extending downwardly therefrom, said support stand having a lower distal end for anchoring said support stand in the earth below a body of water and having adequate length to support the bird body simulated by said housing sufficiently above the surface of the water such that said wing members are out of contact with the water, but close enough to the surface to simulate a bird in flight with wings extended about to land on the surface of the water, said common axis of rotation of said wing members generally transverse to said support stand.

9. The animated bird replica apparatus of claim 8 wherein the length of said support stand is adjustable for permitting said housing and extended wing members to be placed in the desired position above the surface of the water.

10. The animated bird replica apparatus of claim 8 wherein said support stand is in the form of a single vertical pole structure having at least one laterally extending member for gripping when anchoring the support stand in the earth beneath the surface of the water.

11. The animated bird replica apparatus of claim 8 wherein said wing members extend about said common axis of rotation in a substantially planar geometry and each have an outline simulating the shape of a wing of a bird in flight such that rotation of the wing members near the surface of the water simulates the wing movements of a bird preparing to land on the water for attracting waterfowl.

12. The animated bird replica apparatus of claim 11 wherein said elongated support stand has a length which supports the bird replica sufficiently close to the surface of the water to permit the rotating wing members to agitate the water surface in proximity to the wing members.

13. An animated bird replica apparatus employable as a decoy, said apparatus comprising, in combination:

a housing having the configuration of a bird's body having a housing top simulating a bird body top, a head end, said head end resembling a head of a bird, a tail end, and a longitudinal axis extending between said head end and said tail end, said housing defining a housing interior, a pair of bird wing members rotatably connected to said housing between said head end and said tail end, said pair of bird wing members extending outwardly from opposed sides of said housing laterally of said longitudinal axis and fully rotatable around a common axis, said pair of bird wing members further resembling a pair of extended bird wings, an elongated support stand connected to said housing, said support stand extending downwardly from said housing, said support stand having a lower distal end for anchoring in the earth under a body of water and having adequate length to support said housing sufficiently above the surface of a body of water such that said bird wing members are out of contact with the water, but close enough to the surface of the water such that said housing and said bird wing members simulate a bird in flight near a surface of a body of water with wings extended as though about to land, an electric motor disposed within said housing interior, transmission means disposed within said housing interior for removably interconnecting said electric motor to said pair of bird wing members, said transmission means including a rotatable bird wing member support within said housing interior extending between, removably connected to, and supporting said bird wing members, and electric battery means operatively associated with said electric motor to energize and cause operation of said electric motor, said transmission means operatively interconnecting said electric motor to said pair of bird wing members causing rotation of said bird wing members responsive to operation of said electric motor.

14. The animated bird replica apparatus of claim 13 including:

said wing members having inwardly extending mounting shafts, and releasable connector means releasably connecting said mounting shafts to opposed ends of said rotatable bird wing member support.

15. The animated bird replica apparatus of claim 14 wherein:

said mounting shafts are received within said rotatable bird wing member support.

16. The animated bird replica apparatus of claim 14 wherein:

said releasable connector means comprise cotter pins each extending through said rotatable bird wing member support and one of said mounting shafts.

17. The animated bird replica apparatus according to claim 13 wherein:

said elongated support stand includes at least two elongated relatively movable support stand members for varying the effective length of said elongated support stand, said support stand further having at least one laterally projecting handle member to facilitate positioning in and removing from the earth by hand of said support stand, and lock means for selectively locking said support stand members against relative movement.

18. The animated bird replica apparatus according to claim 17 wherein:

said at least one handle member comprises two handle members projecting from opposing sides of said support stand facilitating use of two hands for support stand positioning and removal.

19. The animated bird replica apparatus according to claim 18 wherein:

said at least two support stand members comprises a first support stand member and a second support stand member sized for sliding disposition within an interior of a shaft of said first member, relative sliding movement of said first member and said second member varying the length of said support stand via a telescoping effect.

20. The animated bird replica apparatus according to claim 17 wherein:

said support stand has a rectilinear cross-section.

21. The animated bird replica apparatus according to claim 13 further comprising:

adjustable connector means adjustably and releasably connecting said elongated support stand to said housing, said connector means further for fixing said housing against rotation relative to a longitudinal axis of said support stand, and whereby the pitch of said housing relative to a transverse horizontal axis thereof can be selectively varied.

22. The animated bird replica apparatus according to claim 13 additionally comprising one handle member projecting laterally from said elongated support stand and sized for manual grasping by an individual to facilitate positioning of the elongated support stand in and removal of the elongated support stand from the earth.

23. The animated bird replica apparatus according to claim 13 wherein:

said transmission means is selectively adjustable to terminate operative interconnection between said electric motor and said pair of bird wing members and allow said pair of bird wing members to fully rotate responsive to the impact of wind thereon without said electric motor exerting a drag force impeding rotation.

24. The animated bird replica apparatus according to claim 13 wherein:

said elongated support stand includes at least two elongated relatively movable support stand members for varying the effective length of said elongated support stand, said support stand including a first support stand member and a second support stand member sized for sliding disposition within an interior of a shaft of said first support stand member, a first aperture in said first support stand member, a second aperture in said second support stand member, said second aperture in alignment with said first aperture, and a threaded connector disposed in said first and said second apertures selectively locking said first and second support stand members against relative movement.

25. The animated bird replica apparatus according to claim 13 further comprising:

said elongated support stand having an aperture in a top end thereof, a support member depending from said housing, said support member having a hole transverse to said longitudinal axis of said housing, a threaded connector disposed in said aperture and in said hole adjustably and releasably connecting said housing to said support stand, said housing pivotally connected to said support stand about a longitudinal axis of said threaded connector, such that a forward and aft pitch of said housing may be varied relative to said support stand.

26. The animated bird replica apparatus according to claim 25 wherein:

said threaded connector comprises a bolt and nut.

27. The animated bird replica apparatus according to claim 13 wherein:

said support stand comprises a single telescoping shaft, and said animated bird replica apparatus additionally comprises at least one handle member, at least one said handle member projecting laterally from said telescoping shaft and sized for an individual to grasp by hand to facilitate positioning of said shaft in and removal of said shaft from the earth.

28. The animated bird replica apparatus according to claim 27 wherein: said at least one handle member comprises two handle members disposed on opposite sides of said shaft.

29. An animated bird replica apparatus employable as a decoy comprising:

a housing having a housing top simulating a bird body, said housing defining a housing interior and having a head end, said head end resembling a head of a bird, a tail end, and a longitudinal axis extending between said head end and said tail end, a pair of bird wing members rotatably connected to said housing between said head end and said tail end thereof, said wing members extending laterally of said longitudinal axis of said housing from opposite sides of said housing and being fully rotatable about a common axis of rotation which is substantially perpendicular to said housing's longitudinal axis, said wing members extending about said common axis of rotation in a substantially planar geometry and each having an outline simulating the shape of a wing of a bird in flight such that rotation of the wing members near the surface of the water simulates the movements of a pair of extended wings of a bird preparing to land on the water for attracting waterfowl, an electric motor in said housing interior, wing member drive means in the interior of said housing interconnecting said electric motor and said wing members such that activation of said electric motor will drive said wing members into rotation, and an elongated support stand connected to said housing and extending downwardly therefrom, said support stand having a lower distal end for anchoring the support stand in the earth below a body of water and having adequate length to support said bird body simulated by said housing sufficiently above the surface of the water such that the wing members rotated by said electric motor and said wing member drive means are out of contact with the water but close enough to the surface of the water such that said housing and said bird wing members simulate a bird in flight with wings extended about to land on the surface of the water.

30. The animated bird replica apparatus of claim 29 wherein:

said electric motor has a drive spindle extending substantially perpendicular to the longitudinal axis of said housing, and said wing member drive means includes a shaft rotatably supported in said housing interior substantially perpendicular to the longitudinal axis of said housing and parallel to the drive spindle of said electric motor, and further includes a pulley carried on said shaft and a removable drive belt between said pulley and the spindle of said electric motor, said wing members extending from said shaft on the common axis of rotation and being driven into full rotation by said shaft when said drive belt is engaged, and being freely rotatable in the wind when said drive belt is removed.

31. The animated bird replica apparatus of claim 30 wherein each of said bird wing members are each releasably connected to the shaft of said wing member drive means using cotter pins extending through said shaft.

32. A method of attracting waterfowl to a location over the surface of the water comprising:

choosing a suitable location over the surface of a body of water having earth below the surface of the water in which a support stand of an animated bird replica can be anchored, providing a bird replica which includes a housing having a housing top that simulates a substantially complete bird body with a head end, a tail end, and a longitudinal axis extending between said head end and said tail end, and which further includes a pair of bird wing members connected to said housing between the head end and tail end thereof, said wing members extending laterally of the longitudinal axis of said housing from opposite sides of said housing, said wing members fully rotatable around a common axis, and supporting said bird replica sufficiently above the surface of the water such that the wing members are out of contact with the water, but close to the surface of the water to simulate a bird in flight with wings extended about to land on the surface of the water, said bird replica being supported on a support stand of suitable length capable of being anchored in the earth below the surface of the water at the chosen suitable location.

33. The method of claim 32 wherein said wing members are rotatably connected to said housing and are free to rotate in the wind to simulate an animated bird in flight about to land on the surface of the water.

34. The method of claim 32 comprising rotating said wing members by internal drive power to simulate an animated bird in flight about to land on the surface of the water.

35. The method of claim 34 wherein said bird replica is supported sufficiently close to the surface of the water such that the rotation of the wing members agitates the surface of the water.

36. The method of claim 34 comprising converting the wing members from rotation by said internal drive power to rotation by wind power.

37. A method of attracting waterfowl to a location over the surface of the water comprising:

choosing a suitable location over the surface of a body of water having earth below the surface of the water in which a support stand of an animated bird replica can be anchored, providing a bird replica which includes a housing having a housing top that simulates a substantially complete bird body with a head end, a tail end, and a longitudinal axis extending between said head end and said tail end, and which further includes a pair of bird wing members rotatably connected to said housing between the head end and tail end thereof, said wing members extending laterally of the longitudinal axis of said housing from opposite sides of said housing and being fully rotatable about an axis of rotation substantially perpendicular to the housing's longitudinal axis, supporting said bird replica sufficiently above the surface of the water such that the wing members are out of contact with the water, but close to the surface of the water to simulate a bird in flight with wings extended about to land on the surface of the water, said bird replica being supported on a support stand of suitable length capable of being anchored in the earth below the surface of the water at the chosen suitable location, and rotating said wing members by an internal drive to simulate an animated bird in flight about to land on the surface of the water, said bird replica being supported sufficiently close to the surface of the water to permit the rotating wing members to agitate the surface of the water.

38. The method of claim 37 further comprising:

disengaging said wing members from said internal drive to convert said wing members from rotation by an internal drive power to rotation by wind power.

39. A method of attracting waterfowl to a particular location comprising:

supporting above and out of contact with the surface of a body of water an animated bird replica apparatus comprising a housing having the configuration of a bird's body with a pair of bird wing members configured to allow rotation by wind rotatably connected to said housing extending outwardly from opposed sides of said housing and fully rotatable about a common axis of rotation, said housing containing means for energizing said bird wing members to rotate comprising an electric motor and transmission means for operatively interconnecting said electric motor to said pair of bird wing members, and electric battery means operatively associated with said electric motor to energize and cause operation of said electric motor;

activating said energizing means to rotate said bird wing members, and selectively disconnecting said bird wing members from said energizing means to convert said animated bird replica apparatus to wind power use.

* * * * *

UNITED STATES PATENT AND TRADEMARK OFFICE
CERTIFICATE OF CORRECTION

PATENT NO. : 6,408,559 B2
DATED : June 25, 2002
INVENTOR(S) : Robert Mathews

It is certified that error appears in the above-identified patent and that said Letters Patent is hereby corrected as shown below:

Column 5,
Line 41, change "claim 2" to -- claim 1 --.

Signed and Sealed this

Fifth Day of November, 2002

Attest:

JAMES E. ROGAN
Attesting Officer  Director of the United States Patent and Trademark Office